I. SAMUELS.
Velocipede.
No. 87,205.
Patented Feb. 23, 1869.
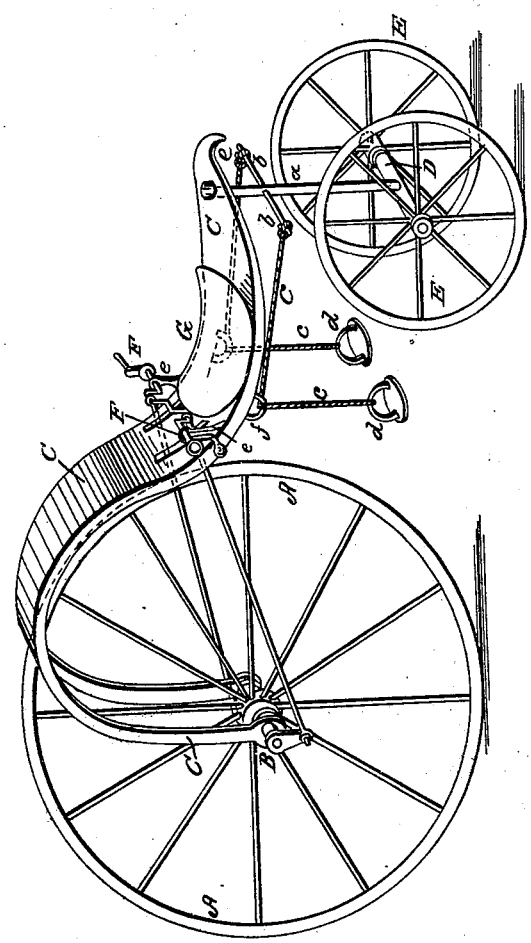

ISAAC SAMUELS, OF MARYSVILLE, KANSAS.

Letters Patent No. 87,205, dated February 23, 1869.

IMPROVED VELOCIPEDE.

The Schedule referred to in these Letters Patent and making part of the same.

*To all whom it may concern:*

Be it known that I, ISAAC SAMUELS, of Marysville, in the county of Marshall, and State of Kansas, have invented a new and improved Velocipede; and I do hereby declare that the following is a full, clear, and exact description thereof, which will enable others skilled in the art to make and use the same, reference being had to the accompanying drawing, forming part of this specification.

The drawing represents a perspective view of my improved velocipede.

This invention relates to a new velocipede, which is set in motion by turning cranks by hand, and which is steered by the lower extremities of the occupant.

The invention consists in the general construction and arrangement of parts, whereby the desired result, to wit, causing the instrument to move rapidly, with the application of very little exertion, is attained in a simple and effective manner.

A, in the drawing, represents the front driving-wheel of the velocipede.

It is mounted on a crank-shaft, B, which has its bearings in the lower ends of a bifurcated frame, C.

The rear end of this frame is swivelled to an upright bar, a, that projects from the axle D of the rear wheels E E.

A cross-bar, b, is mounted on the bar a, and to its ends are fastened straps, or cords c c, that are fitted through loops, or staples f f, projecting from the sides of the frame.

On the ends of the cords c are fastened stirrups, or foot-supports d d, as shown.

On the frame C are mounted lugs e e, which support another crank-shaft, F, the cranks of which are, by means of rods g g, or equivalent mechanism, connected with the cranks of the front shaft B.

A seat, G, is arranged on the frame, behind the shaft F, as shown.

The person on the seat can readily put the feet into the stirrups, and revolve, with the hands, the shaft F, thereby imparting rotary motion to the front shaft and wheel.

With the feet, the apparatus is steered, as the rear axle is caused to swing on its pivot a.

The velocipede is thus propelled by hand, and steered with the feet, and will be light and of simple construction.

Having thus described my invention,

I claim as new, and desire to secure by Letters Patent—

A velocipede, which consists of the frame C, front crank-axle B, and wheel A, and of the crank-shaft F, for imparting rotary motion to the crank-axle by hand, as well as of the pivoted rear axle D, and wheels E, which can be regulated by means of the feet, that act in stirrups d on straps c, substantially as set forth, all made and operating as herein shown and described.

ISAAC SAMUELS

Witnesses:
 JACOB CHENINSKY,
 H. W. BLACK.